Patented Aug. 5, 1930

1,772,311

UNITED STATES PATENT OFFICE

WILLI HARTMANN, OF WIESDORF-ON-THE-RHINE, GERMANY, ASSIGNOR TO GENERAL ANILINE WORKS, INC., OF NEW YORK, N. Y., A CORPORATION OF DELAWARE

PROCESS FOR PRODUCING 1-BENZOYLAMINO-4-CHLOROANTHRAQUINONE

No Drawing. Application filed December 23, 1927, Serial No. 242,280, and in Germany December 22, 1926.

The present invention concerns the manufacture of 1-benzoylamino-4-chloroanthraquinone and consists in subjecting 1-benzoylamino-anthraquinone in nitrobenzene as solvent to the action of a chlorinating agent, for example, chlorine or substances yielding chlorine, in the presence or absence of catalysts.

In accordance with the invention, the manufacture of 1-benzoylamino-4-chloroanthraquinone is carried out with extraordinary ease by the action of chlorine or substances yielding chlorine, such as for example, sulfurylchloride, on 1-benzoylamino-anthraquinone in nitrobenzene as solvent and if desired in the presence of suitable catalysts, e. g. iodine and ferric chloride.

The temperature at which reaction takes place may vary in wide limits, e. g. I have found that the reaction slowly takes place at ordinary temperature, the most favourable temperature for performing the reaction however being 50–70° C. but the reaction can also be effected at higher temperatures.

The following examples will illustrate my invention:

*Example 1.*—50 grams of 1-benzoylamino-anthraquinone are suspended in 200 grams of nitrobenzene, 126 grams of sulfuryl chloride are added and the reaction mixture is stirred for 15 hours at 60° C. On cooling the 1-benzoylamino-4-chloro-anthraquinone, which has separated, is filtered and washed with alcohol.

*Example 2.*—50 grams of 1-benzoylamino-anthraquinone are stirred into 200 cc. of nitrobenzene and chlorine is caused to pass through this suspension at 60° C. The working up of the resulting product is carried out as in Example 1.

*Example 3.*—34 grams of α-amino-anthraquinone are suspended in 172 cc. of nitrobenzene, 25.8 grams of benzoyl chloride are added and the reaction mixture is heated to 120° C. for one hour. After cooling to 60° C., 84 grams of sulfuryl chloride are added and the temperature maintained for 15 hours. The working up of the resulting product is carried out as in Example 1.

By adding 0.1 gram of iodine as catalyst to the reaction mass the reaction proceeds more quickly.

I claim:—

1. The process of producing 1-benzoylamino-4-chloro-anthraquinone which process comprises reacting upon 1-benzoylamino-anthraquinone with sulfurylchloride in nitrobenzene as solvent at about 60° C. in the presence of iodine.

2. A process which comprises reacting upon 1-benzoylamino-anthraquinone in nitrobenzene as solvent with a chlorinating agent.

3. A process which comprises reacting upon 1-benzoylamino-anthraquinone in nitrobenzene as solvent with a chlorinating agent at a temperature between 50–70° C.

4. A process which comprises reacting upon 1-benzoylamino-anthraquinone in nitrobenzene as solvent with a chlorinating agent in the presence of a catalyst favorable to chlorination.

5. A process which comprises reacting upon 1-benzoylamino-anthraquinone in nitrobenzene as solvent with a chlorinating agent at a temperature between 50–70° C. in the presence of a catalyst favorable to chlorination.

6. A process which comprises reacting upon 1-benzoylamino-anthraquinone in nitrobenzene as solvent with a chlorinating agent in the presence of iodine as catalyst.

7. A process which comprises reacting upon 1-benzoylamino-anthraquinone in nitrobenzene as solvent with a chlorinating agent at a temperature between 50–70° C. in the presence of iodine as catalyst.

In testimony whereof I have hereunto set my hand.

DR. WILLI HARTMANN.